No. 642,775. Patented Feb. 6, 1900.
J. C. ANDERSON.
METHOD OF MAKING PNEUMATIC TIRES.
(Application filed July 21, 1899.)
(No Model.)
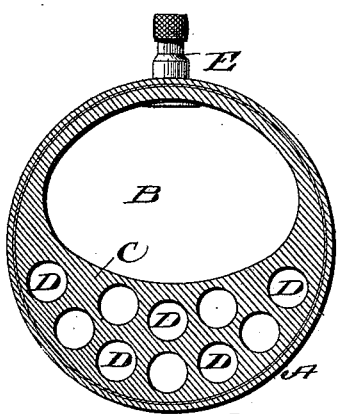
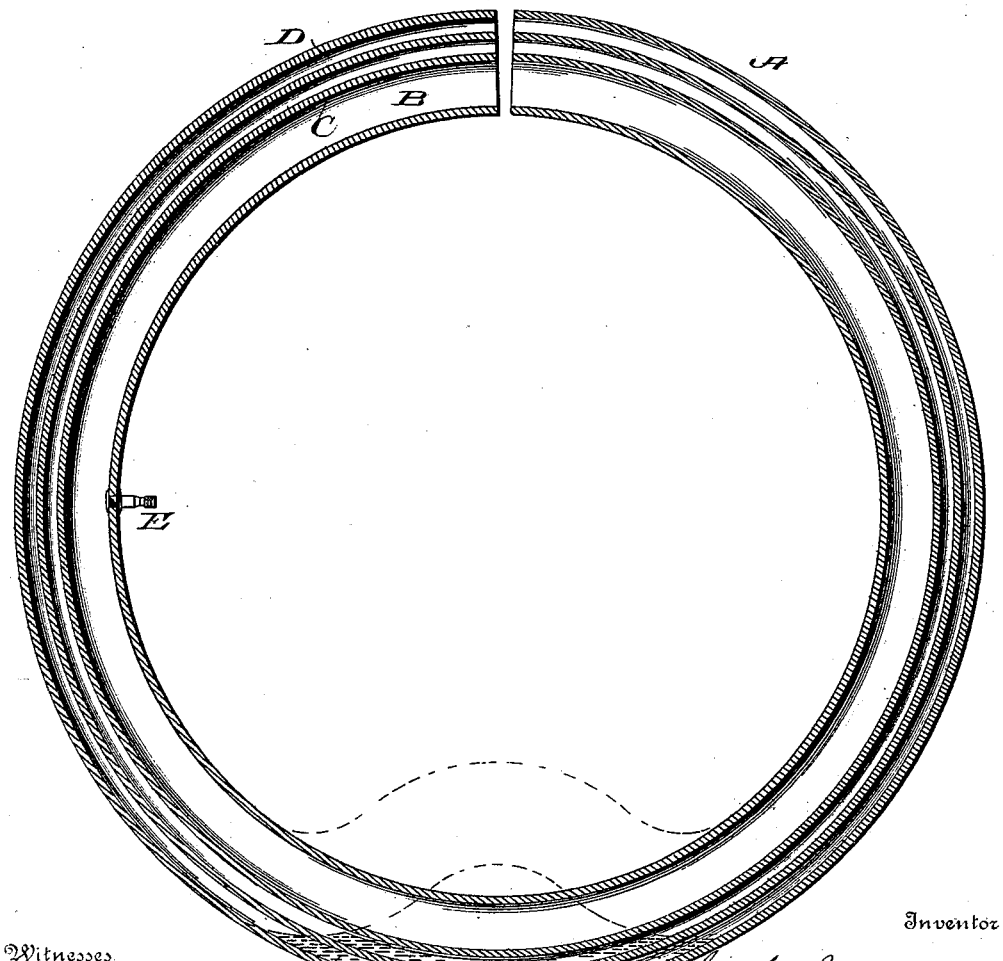

UNITED STATES PATENT OFFICE.

JAMES C. ANDERSON, OF HIGHLAND PARK, ILLINOIS.

METHOD OF MAKING PNEUMATIC TIRES.

SPECIFICATION forming part of Letters Patent No. 642,775, dated February 6, 1900.

Application filed July 21, 1899. Serial No. 724,682. (No specimens.)

*To all whom it may concern:*

Be it known that I, JAMES C. ANDERSON, a citizen of the United States, residing at Highland Park, in the county of Lake and State of Illinois, have invented certain new and useful Improvements in Methods of Making Pneumatic Tires; and I do hereby declare the following to be a full, clear, and exact description of the invention, such as will enable others skilled in the art to which it appertains to make and use the same.

My invention relates to a new and improved method of constructing pneumatic tires of the character described and shown in an application filed simultaneous with this and which tire involves a main inflatable and deflatable air-space and a series of non-deflatable air-chambers exterior to the main air-chamber.

In manufacturing the improved tire referred to I employ the following method, which I will describe, having reference to the accompanying drawings, in which—

Figure 1 represents a cross-section of a tube employed in making the tire, and Fig. 2 a transverse section of said tube bent into circular or tire form with its ends exposed and ready for vulcanizing the same together.

I first form the tube of rubber, having a suitable strengthening-lamina A and with a main air-space B and an exterior crescent-shaped body C, provided with a series of supplemental air-chambers D. I then bend the tube into form approaching a circle, and before bringing the two ends (which are shown separated at Fig. 2) together and uniting them by vulcanization I deposit in each of the supplemental air-spaces D a charge of liquid air, said charge of air being sufficient when expanded under natural temperatures to fully inflate said air-spaces and to such an extent as to resist the ordinary external pressure exerted upon the tire in practical use. These charges of liquid air when introduced will flow by gravity to the locality indicated by dotted lines E at the bottom of Fig. 2. I then bring the two ends of the tube together and join them by vulcanization in the ordinary manner or in any other suitable way, and either before or after joining the ends of the tube I connect an air-valve E with the main air-space B. When the ends of the tube have been connected, the supplemental air-spaces D will have an unbroken continuity, and as the contained air is automatically and subsequently expanded the said spaces will be thoroughly inflated and absolutely non-deflatable.

In the process of manufacture if it be found under given conditions of temperature that the charges of liquid air are liable to expand before the ends of the tube can be permanently and securely joined I dip the lower portion of the bent tube in a bath of liquid air to prevent the expansion of the air contained within the several supplemental air-spaces D.

While I have described and contemplate the use of liquid air as the preferred body or agent for permanently inflating the supplemental air-spaces, I desire it to be understood that I may employ any other body which may be made to expand with an absolutely closed space or cell and perform the same function when expanded. For instance, liquefied carbonic-acid gas may be employed or calcium carbid and water. In the latter case it is of course important and necessary that the carbid and the water should not be brought into contact with each other until a perfect juncture has been effected between the ends of the tube, and to secure this result I buckle the lower portion of the tube, as shown in dotted lines at Fig. 2, which constitutes a central dam. I then deposit the charge of calcium carbid into one end of the several air-spaces D and a suitable quantity of water in the other end of said spaces. The carbid and the water each flow by gravity to the bottom and each side of the central dam and out of contact with each other.

To secure the best results in the use of calcium carbid and water, I finely comminute the former, and, if thought desirable, I may deposit in the air-spaces D a suitable quantity of any suitable viscid material, which will commingle with and have affinity for the natural residuum resulting from action of the water upon the carbid, and thus form a viscid body or paste adapted to automatically heal any puncture which may be made in any of said air-spaces D.

I have described the use of liquefied carbonic-acid gas and also carbid and water to illustrate the generic character of my improved method, which involves the novel idea of inflated closed air-spaces of a pneumatic tire by the natural expansion of the inflating-body capable of resisting the external pressure exerted upon a tire in ordinary and practical use, in contradistinction to the usual method of inflation by introducing the inflatable body into the air-space under pressure, or, to state the situation differently with a view of defining the broad character of my invention, the inflation of pneumatic tires prior to my invention has been accomplished solely by introducing an expanded or natural body into the air-space and compressing it therein by mechanical power, while my invention contemplates the introduction of a compressed body and automatically expanding it to a degree such that it will perform the same function as the mechanically-compressed air within the ordinary pneumatic tire within an absolutely sealed or closed space.

It will be understood that in a tire having a main air space or chamber surrounded by a series of auxiliary air spaces or chambers it would be practically impossible to provide both the main air-chamber and the auxiliary air-chambers with air-valves, through which all may be mechanically inflated, because it would involve a mutiplicity and complication of air-valves and consequent leakage, and hence it is that in the art as at present exemplified whenever a tire is formed with a main air-chamber provided with a valve and adapted to be mechanically inflated and a series of auxiliary air-chambers adjacent to or surrounding the main air-chamber such auxiliary air-chambers are designed to contain (as of necessity they must) ordinary atmospheric air, which will in no sense constitute a pneumatic cushion, and all such tires merely combine the individual characteristics of a pneumatic and the individual characteristics of a cushion tire.

My improved tire is simply and purely pneumatic in its character and having characteristics not found in the ordinary pneumatic tire.

What I claim as new, and desire to secure by Letters Patent, is—

1. The method herein described, of constructing pneumatic tires consisting in forming a tube with a main air-space adapted to be inflated and deflated, and provided with an air-valve and a series of supplemental air-spaces, separated from each other and the main air-space, charging the supplemental air-spaces with an expansible body or agent, of the character described, then joining the ends of the tube to constitute a tire and to permanently confine the expansible body within the supplemental air-spaces, and finally causing the confined expansible body to expand and sustain the supplemental air-spaces, substantially as and for the purpose set forth.

2. The method herein described, of manufacturing pneumatic tires which consists in making a tube with a main longitudinal air-space and a series of longitudinal supplemental air-spaces, providing the main air-space with an air-valve; charging the supplemental air-spaces with an inflatable agent of the character described in compressed form, then joining the ends of the tube to constitute a tire and to permanently seal and confine the inflatable agent or body within the supplemental air-spaces and subsequently expanding the inflatable agent, as and for the purpose set forth.

In testimony whereof I affix my signature in presence of two witnesses.

JAMES C. ANDERSON.

Witnesses:
   JENNIE G. BOOTH,
   N. CURTIS LAMMOND.